United States Patent
Peltz et al.

(10) Patent No.: US 10,371,099 B2
(45) Date of Patent: Aug. 6, 2019

(54) SPARK PLUG AND ASSOCIATED PROPELLANT IGNITION SYSTEM

(71) Applicant: The Boeing Company, Chicago, IL (US)

(72) Inventors: Leora Peltz, Pasadena, CA (US); William Gregory Peterson, Menifee, CA (US); Robert V. Frampton, Pasadena, CA (US)

(73) Assignee: The Boeing Company, Chicago, IL (US)

( * ) Notice: Subject to any disclaimer, the term of this patent is extended or adjusted under 35 U.S.C. 154(b) by 508 days.

(21) Appl. No.: 15/091,192

(22) Filed: Apr. 5, 2016

(65) Prior Publication Data

US 2017/0284340 A1    Oct. 5, 2017

(51) Int. Cl.

| | |
|---|---|
| F02K 9/94 | (2006.01) |
| F02K 9/95 | (2006.01) |
| H01T 13/41 | (2006.01) |
| H01T 13/54 | (2006.01) |
| H01T 13/22 | (2006.01) |
| F02C 7/264 | (2006.01) |

(Continued)

(52) U.S. Cl.
CPC ............... *F02K 9/95* (2013.01); *F02C 7/264* (2013.01); *F02C 7/266* (2013.01); *F02K 9/94* (2013.01); *H01T 13/20* (2013.01); *H01T 13/22* (2013.01); *H01T 13/34* (2013.01); *H01T 13/38* (2013.01); *H01T 13/41* (2013.01); *H01T 13/54* (2013.01); *H01T 13/08* (2013.01)

(58) Field of Classification Search
CPC .... F02K 9/94; F02K 9/95; F02C 7/264; F02C 7/266; H01T 13/08; H01T 13/20; H01T 13/22; H01T 13/34; H01T 13/38; H01T 13/086; H01T 13/54; H01T 13/41
USPC ........................................................ 313/118
See application file for complete search history.

(56) References Cited

U.S. PATENT DOCUMENTS

| 889,338 | A | * | 6/1908 | Schultz | ................. H01T 13/22 |
| | | | | | 174/152 S |
| 1,375,926 | A | * | 4/1921 | Nelson | ................. H01T 13/22 |
| | | | | | 313/122 |

(Continued)

FOREIGN PATENT DOCUMENTS

| EP | 1 983 807 | 10/2008 |
| EP | 2 455 661 | 5/2012 |
| WO | WO 2008/127467 | 10/2008 |

OTHER PUBLICATIONS

European Patent Office, Extended European Search Report, EP 17 15 1553 (dated Jun. 28, 2017).

*Primary Examiner* — William H Rodriguez
*Assistant Examiner* — Kyle Robert Thomas
(74) *Attorney, Agent, or Firm* — Walters & Wasylyna LLC

(57) ABSTRACT

A spark plug having an insulating body defining a longitudinal axis and including a base portion and an obstruction portion, a first electrode including a proximal portion, a sheathed portion and a distal portion, the sheathed portion of the first electrode extending through the base portion of the insulating body, and a second electrode including a proximal portion, a sheathed portion and a distal portion, the sheathed portion of the second electrode extending through the base portion and the obstruction portion of the insulating body, wherein the obstruction portion axially extends beyond the distal portion of the first electrode.

20 Claims, 3 Drawing Sheets

(51) Int. Cl.
  *F02C 7/266* (2006.01)
  *H01T 13/20* (2006.01)
  *H01T 13/38* (2006.01)
  *H01T 13/34* (2006.01)
  *H01T 13/08* (2006.01)

(56) References Cited

U.S. PATENT DOCUMENTS

| | | | | |
|---|---|---|---|---|
| 1,397,535 | A * | 11/1921 | Minor | H01T 13/22 |
| | | | | 313/139 |
| 3,057,149 | A * | 10/1962 | Leinweber | F02K 9/95 |
| | | | | 60/257 |
| 3,133,409 | A * | 5/1964 | Fox | F02K 9/95 |
| | | | | 60/224 |
| 3,343,366 | A * | 9/1967 | Siegler | F02P 17/02 |
| | | | | 313/123 |
| 3,377,219 | A | 4/1968 | Stiefel et al. | |
| 3,974,412 | A * | 8/1976 | Pratt, Jr. | F02P 9/007 |
| | | | | 123/169 EL |
| 5,799,637 | A * | 9/1998 | Cifuni | H01T 13/54 |
| | | | | 123/169 PA |
| 6,170,458 | B1 * | 1/2001 | Miller | F02B 77/13 |
| | | | | 123/295 |
| 7,906,894 | B2 * | 3/2011 | Kameda | H01T 13/32 |
| | | | | 313/118 |
| 9,806,499 | B2 * | 10/2017 | Terada | H01T 13/32 |
| 2007/0216277 | A1 * | 9/2007 | Yoshida | H01T 13/20 |
| | | | | 313/141 |

* cited by examiner

SPARK PLUG AND ASSOCIATED PROPELLANT IGNITION SYSTEM

FIELD

This application relates to propellant ignition and, more particularly, to spark-based ignition of propellants and, even more particularly, to spark-based ignition of propellants moving at relatively high flow rates.

BACKGROUND

In accordance with Newton's third law of motion, thrust is generated when a propellant is ignited in a combustion chamber and the resulting combustion gases are passed through a nozzle. For example, a rocket engine, such as a rocket engine associated with a commercial rocket carrying a civilian payload, may include an injector, a combustion chamber, an ignition system and a nozzle. The injector may inject a propellant into the combustion chamber where the propellant may be ignited by the ignition system. The resulting combustion of the propellant may generate high-pressure combustion gases, which may be expelled through the nozzle. The resulting thrust may propel the associated rocket against the forces of drag and gravity.

Various ignition systems have been used to ignite propellants. For example, pyrotechnic-based ignition systems are commonly used to ignite solid propellants, while electrical ignition systems are commonly used to ignite fluid propellants (e.g., liquid propellants, gaseous propellants and/or aerosolized propellants). Ignition of fluid propellants is complicated by the fact that fluid propellants flow through the combustion chamber. As the flow rate of a fluid propellant increases, it often becomes more difficult to achieve a sustained ignition, particularly in the case of a gaseous or aerosolized propellant moving at a flow rate that is greater than the flame speed of the propellant.

Accordingly, those skilled in the art continue with research and development efforts in the field of propellant ignition.

SUMMARY

In one embodiment, disclosed is a spark plug having an insulating body defining a longitudinal axis and including a base portion and an obstruction portion, a first electrode including a proximal portion, a sheathed portion and a distal portion, the sheathed portion of the first electrode extending through the base portion of the insulating body, and a second electrode including a proximal portion, a sheathed portion and a distal portion, the sheathed portion of the second electrode extending through the base portion and the obstruction portion of the insulating body, wherein the obstruction portion axially extends beyond the distal portion of the first electrode.

In another embodiment, the disclosed propellant ignition system may include a combustion chamber defining a longitudinal axis, a propellant flowing through the combustion chamber and a spark plug extending into the combustion chamber, the spark plug including an insulating body having a base portion and an obstruction portion, a first electrode extending through the base portion of the insulating body and a second electrode extending through the base portion and the obstruction portion of the insulating body, the second electrode being spaced apart from the first electrode to define a gap therebetween, wherein the obstruction portion is in flow alignment with the gap.

In yet another embodiment, disclosed is a method for igniting a flowing propellant that includes the steps of (1) positioning a first electrode relative to a second electrode such that a gap is formed therebetween, (2) positioning an obstruction portion in flow alignment with the gap, and (3) applying a voltage across the first electrode and the second electrode to generate a spark in the gap.

Other embodiments of the disclosed spark plug and associated propellant ignition system will become apparent from the following detailed description, the accompanying drawings and the appended claims.

DETAILED DESCRIPTION

Figure 1:
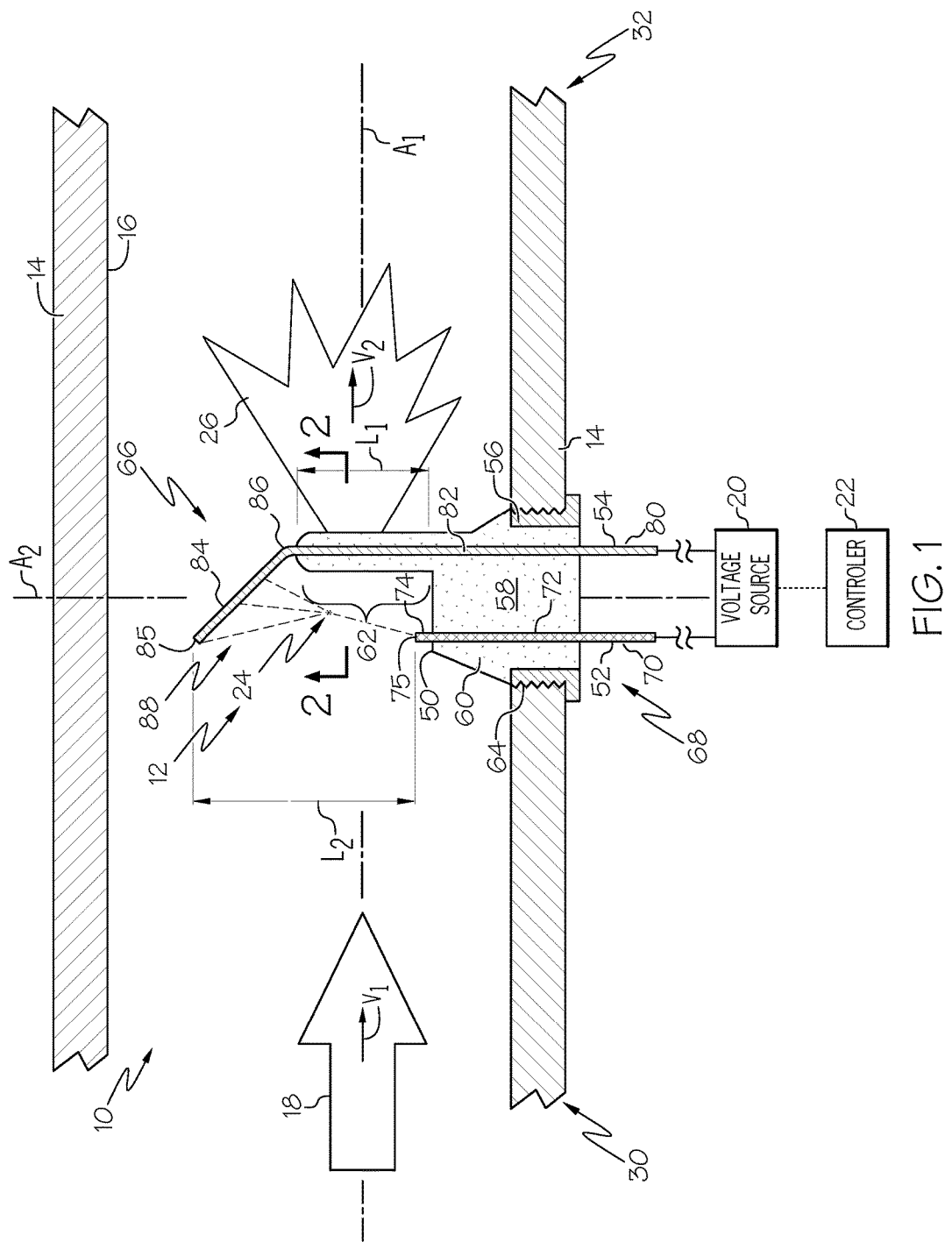
FIG. 1 is a schematic cross-sectional view of one embodiment of the disclosed propellant ignition system.

Referring to FIG. 1, one embodiment of the disclosed propellant ignition system, generally designated 10, may include a spark plug 12, a structure 14 defining a combustion chamber 16, and a propellant 18 (represented by an arrow) flowing through the combustion chamber 16. The spark plug 12 may be electrically coupled with a voltage source 20, which may optionally be controlled by a controller 22 (e.g., a computer or other processing device). When the voltage source 20 applies a voltage of sufficient magnitude to the spark plug 12, the spark plug 12 may generate a spark 24 that ignites the propellant 18, thereby yielding a flame 26 that includes a plasma and/or combustion gases. The flame 26 may persist so long as propellant 18 is present in the combustion chamber 16, even after the spark 24 ceases to exist.

The combustion chamber 16 of the propellant ignition system 10 may be elongated along a longitudinal axis $A_1$ (the flow path), and may include an inlet end 30 and an outlet end 32 longitudinally opposed from the inlet end 30. Therefore, the propellant 18 may enter the combustion chamber 16 proximate (at or near) the inlet end 30 and may flow toward the spark plug 12 and the outlet end 32. The flame 26 may exit the combustion chamber 16 proximate (at or near) the outlet end 32.

The structure 14 defining the combustion chamber 16 may be formed from a rigid and heat-resistant material. As one example, the structure 14 may be formed from a high-temperature metallic material, such as steel or a titanium alloy. As another example, the structure 14 may be formed from a ceramic material, such as alumina. As yet another example, the structure 14 may be formed from a combination of materials, such as a combination of metals/metal alloys and ceramic materials.

In one particular construction, the combustion chamber 16 may be generally cylindrical (e.g., may have a generally circular profile when viewed along the longitudinal axis $A_1$). However, those skilled in the art will appreciate that combustion chambers 16 having various geometries and configurations may be used without departing from the scope of the present disclosure.

The propellant 18 of the propellant ignition system 10 may be a fluid propellant and, therefore, may be capable of flowing through the combustion chamber 16 at a flow rate. In one expression, the propellant 18 may be in a gaseous state (e.g., may consist of one or more gases) in the combustion chamber 16. In another expression, the propellant 18 may be an aerosol (e.g., may include a liquid phase and/or a solid phase suspended in a gaseous phase) in the combustion chamber 16. In yet another expression, the propellant 18 may be in a liquid state (e.g., may consist of one or more liquids) in the combustion chamber 16.

Compositionally, various propellants may be used without departing from the scope of the present disclosure. The propellant 18 may be a mixture that includes a fuel component and an oxidizer component, wherein the fuel component of the propellant 18 is compositionally different from the oxidizer component. For example, the fuel component of the propellant 18 may be an organic compound (or mixture of organic compounds) and the oxidizer component of the propellant 18 may be nitrous oxide ($N_2O$). Alternatively, the propellant 18 may include a fuel component and an oxidizer component that are one and the same (e.g., nitromethane).

The propellant 18 of the propellant ignition system 10 may have a flame speed, which may depend on the composition of the propellant 18. The superficial velocity $V_1$ of the propellant 18 (the flow rate of the propellant 18 divided by the cross-sectional area of the combustion chamber 16) may be greater than the flame speed $V_2$ of the propellant 18. In one expression, the superficial velocity $V_1$ of the propellant 18 may be at least 10 percent greater than the flame speed $V_2$ of the propellant 18. In another expression, the superficial velocity $V_1$ of the propellant 18 may be at least 20 percent greater than the flame speed $V_2$ of the propellant 18. In another expression, the superficial velocity $V_1$ of the propellant 18 may be at least 50 percent greater than the flame speed $V_2$ of the propellant 18. In another expression, the superficial velocity $V_1$ of the propellant 18 may be at least 100 percent greater than the flame speed $V_2$ of the propellant 18. In yet another expression, the superficial velocity $V_1$ of the propellant 18 may be at least 200 percent greater than the flame speed $V_2$ of the propellant 18. However, the superficial velocity $V_1$ of the propellant 18 may be less than (or equal to) the flame speed $V_2$ of the propellant 18 without departing from the scope of the present disclosure.

The spark plug 12 of the propellant ignition system 10 may include an insulating body 50, a first electrode 52 and a second electrode 54. The spark plug 12 may include various additional components and features, such as a threaded collar 56 or the like for effecting a connection between the spark plug 12 and the structure 14 defining the combustion chamber 16, without departing from the scope of the present disclosure.

The insulating body 50 of the spark plug 12 may be formed from (or may include) an electrical insulator material 58. Various solid dielectric materials (including combinations of materials), particularly solid dielectric materials capable of withstanding relatively high temperatures, may be used as the electrical insulator material 58 of the insulating body 50 without departing from the scope of the present disclosure. As one general, non-limiting example, the electrical insulator material 58 of the insulating body 50 may be a ceramic material. As one specific, non-limiting example, the electrical insulator material 58 of the insulating body 50 may be sintered alumina. As another specific, non-limiting example, the electrical insulator material 58 of the insulating body 50 may be porcelain. As yet another specific, non-limiting example, the electrical insulator material 58 of the insulating body 50 may be glass with high melting temperature and high mechanical strength.

The insulating body 50 of the spark plug 12 may be elongated along a longitudinal axis $A_2$, which may be generally perpendicular to the longitudinal axis $A_1$ of the combustion chamber 16 and, therefore, generally perpendicular to the flow path of the propellant 18. The insulating body 50 may be monolithic, and may include a base portion 60 and an obstruction portion 62. The obstruction portion 62 of the insulating body 50 may extend (e.g., axially vis-à-vis longitudinal axis $A_2$) from and beyond the base portion 60.

The threaded collar 56 may be coaxially received (vis-à-vis longitudinal axis $A_2$) over, and fixedly connected to (e.g., press fit onto), the base portion 60 of the insulating body 50. The threaded collar 56 may be formed from a different material than the insulating body 50, such as from, for example, a metal or metal alloy. Therefore, the spark plug 12 may be connected to the structure 14 defining the combustion chamber 16 by threading the threaded collar 56 of the spark plug 12 into a corresponding threaded bore 64 in the structure 14.

Once the spark plug 12 is connected to the structure 14, the distal portion 66 of the spark plug 12 may extend into the combustion chamber 16, while the proximal portion 68 of the spark plug 12 may remain accessible outside of the combustion chamber 16. Therefore, the voltage source 20 may be electrically coupled with the proximal portion 68 of the spark plug 12, particularly with the first electrode 52 and the second electrode 54 proximate the proximal portion 68 of the spark plug 12.

The first electrode 52 of the spark plug 12 may extend through the base portion 60 of the insulating body 50. Therefore, the first electrode 52 may include a proximal portion 70, a sheathed portion 72 and a distal portion 74, wherein the sheathed portion 72 of the first electrode 52 is sheathed by the electrical insulator material 58 of the base portion 60 of the insulating body 50 and is disposed between the proximal portion 70 and the distal portion 74. The distal portion 74 of the first electrode 52 may be substantially free of the electrical insulator material 58, or may be flush with the distal surface of the base portion 60 of the insulating body 50, or may be recessed within the base portion 60 of the insulating body 50.

The second electrode 54 of the spark plug 12 may extend through the base portion 60 and the obstruction portion 62 of the insulating body 50. Therefore, the second electrode 54 may include a proximal portion 80, a sheathed portion 82 and a distal portion 84, wherein the sheathed portion 82 of the second electrode 54 is sheathed by the electrical insulator material 58 of the base portion 60 and the obstruction portion 62 of the insulating body 50, and is disposed between the proximal portion 80 and the distal portion 84. The distal portion 84 of the second electrode 54 may be substantially free of the electrical insulator material 58, or it may have electrical insulator material 58 any distance out to the distal-most tip 85.

The distal portion 84 of the second electrode 54 may extend (e.g., axially vis-à-vis longitudinal axis $A_2$) beyond the distal portion 74 of the first electrode 52. Furthermore, the distal portion 84 of the second electrode 54 may include a bend 86 such that the distal-most tip 85 of the second electrode 82 is substantially axially aligned (vis-à-vis longitudinal axis $A_2$) with the distal-most tip 75 of the first electrode 52. Therefore, a gap 88 may be defined between the distal portion 74 of the first electrode 52 and the distal portion 84 of the second electrode 54. The spark 24 may be formed within the gap 88.

The obstruction portion 62 of the insulating body 50 of the spark plug 12 may extend (e.g., axially vis-à-vis longitudinal axis $A_2$) beyond the distal-most tip 75 of the distal portion 74 of the first electrode 52. Therefore, the obstruction portion 62 may be in flow alignment (axially aligned vis-à-vis longitudinal axis $A_1$) with the gap 88 between the distal portion 74 of the first electrode 52 and the distal portion 84 of the second electrode 54. As such, the obstruction portion 62 may be positioned to obstruct the flow of propellant 18 proximate and generally in-stream with the gap 88 and, thus, the spark 24 generated by the spark plug 12. For example, as shown in FIG. 1, the obstruction portion 62 may be immediately downstream of the gap 88 (and spark 24). Alternatively, depending on the orientation of the spark plug 12 about the longitudinal axis $A_2$, the obstruction portion 62 may be immediately upstream of the gap 88 (and spark 24) and/or slightly laterally displaced from the gap 88 (and spark 24).

The obstruction portion 62 of the insulating body 50 may have a first length $L_1$ (along the longitudinal axis $A_2$) and the gap 88 may have a second length $L_2$ (along the longitudinal axis $A_2$). The second length $L_2$ may be greater than the first length $L_1$. In one expression, the first length $L_1$ may be at least 20 percent of the second length $L_2$. In another expression, the first length $L_1$ may be at least 40 percent of the second length $L_2$. In another expression, the first length $L_1$ may be at least 50 percent of the second length $L_2$. In another expression, the first length $L_1$ may be at least 60 percent of the second length $L_2$. In yet another expression, the first length $L_1$ may be at least 30 percent of the second length $L_2$ and at most 90 percent of the second length $L_2$. The length of the obstruction portion 62 (first length $L_1$) may be a design consideration, and may be optimized for a particular propellant 18 and flow rate of the propellant 18.

Figure 2:
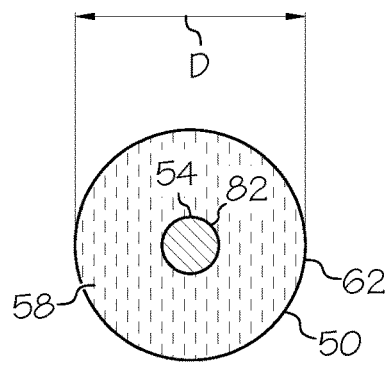
FIG. 2 is a cross-sectional view of a portion of the spark plug of the propellant ignition system of FIG. 1.
Figure 3:
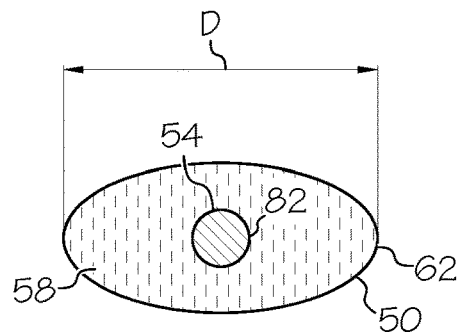
FIG. 3 is a cross-sectional view of one variation of the portion of the spark plug shown in FIG. 2.
Figure 4:
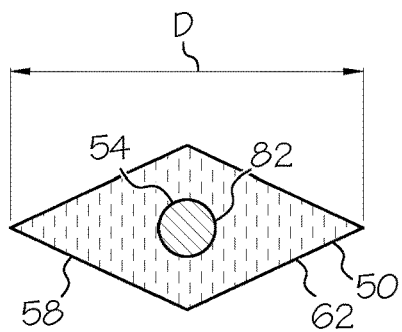
FIG. 4 is a cross-sectional view of another variation of the portion of the spark plug shown in FIG. 2.

Referring to FIGS. 2-4, the obstruction portion 62 of the insulating body 50 may have a size (e.g., maximum cross-sectional dimension D) and a cross-sectional shape, which may be regular or irregular. For example, the cross-sectional shape of the obstruction portion 62 may be circular (FIG. 2), elliptical/oblong (FIG. 3) or rhombus (FIG. 4). Obstruction portions 62 having various sizes and cross-sectional shapes may be used without departing from the scope of the present disclosure. Indeed, the size and cross-sectional shape of the obstruction portion 62 may be a design consideration, and may be optimized for a particular propellant 18 and flow rate of the propellant 18.

Without being limited to any particular theory, it is believed that positioning the obstruction portion 62 of the insulating body 50 of the spark plug 12 in flow alignment with the gap 88 between the distal portion 74 of the first electrode 52 and the distal portion 84 of the second electrode 54 and, thus, in flow alignment with the spark 24 generated by the spark plug 12 may interfere with the flow of the propellant 18 and, as such, may create turbulence and pockets of slower flow proximate the gap 88, particularly in the case of high speed flows. Therefore, the obstruction portion 62 may function as a flame holder that may sustain the flame 26 even after the spark 24 ceases to exist.

The disclosed spark plug 12 may optionally be used to facilitate the disclosed method for igniting a flowing propellant 18. In one particular aspect, the disclosed method for igniting a flowing propellant 18 may begin with the step of positioning a first electrode 52 relative to a second electrode 54 such that a gap 88 is formed therebetween. As another step of the disclosed method, an obstruction portion, such as the obstruction portion 62 of the disclosed spark plug 12, may be positioned in flow alignment with the gap 88. As yet another step of the disclosed method, a voltage may be applied across the first electrode 52 and the second electrode 54 (such as by voltage source 20) to generate a spark 24 in the gap 88. The spark 24 may then ignite the flowing propellant 18.

Accordingly, the spark plug 12 of the disclosed propellant ignition system 10 may enable sustained ignition over a wide range of flows, while maintaining the advantage of low-energy ignition, thereby reducing (if not eliminating) the risk of flashback. The spark plug 12, particularly the obstruction portion 62 of the insulating body 50 of the spark plug 12, may be optimized for the specific geometry of the combustion chamber 16, as well as for the particular injector 212 (FIG. 5) supplying propellant 18 to the combustion chamber 16. Furthermore, while only one spark plug 12 is shown in FIG. 1, multiple spark plugs 12 may be used in tandem operation.

Figure 5:
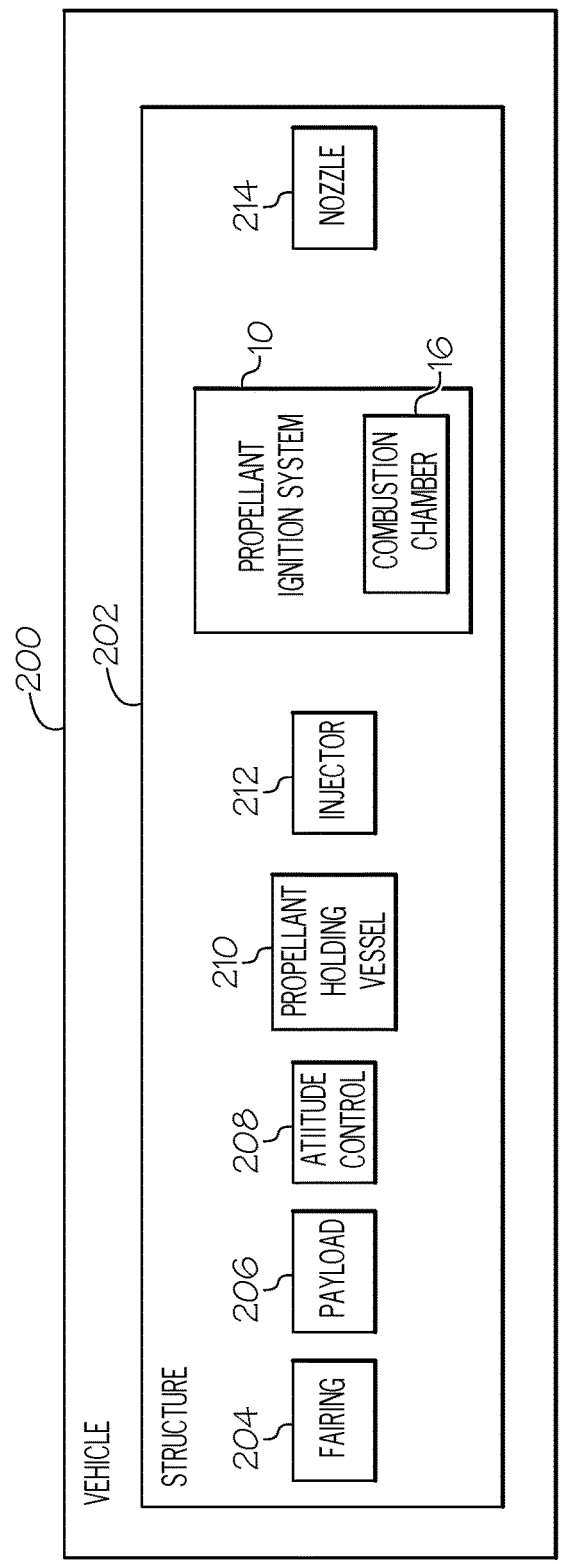
FIG. 5 is a block diagram depicting a vehicle embodying the propellant ignition system of FIG. 1.

Referring to FIG. 5, also disclosed is a vehicle 200, such as a rocket or the like, incorporating the disclosed propellant ignition system 10. The vehicle 200 may include a structure 202 (e.g., a monocoque structure) that supports a fairing 204, a payload 206 and one or more attitude controls 208. The vehicle 200 may be propelled by thrust generated by combusting a propellant 18 (FIG. 1) in a combustion chamber 16 using the disclosed propellant ignition system 10. Specifically, an injector 212 may move a propellant 18 from one or more propellant holding vessels 210 into the combustion chamber 16. In the combustion chamber 16, the propellant ignition system 10 may ignite the propellant 18 to yield a flame 26 (FIG. 1), and the flame 26 may be passed through a nozzle 214 to generate thrust.

Although various embodiments of the disclosed spark plug and associated propellant ignition system have been shown and described, modifications may occur to those skilled in the art upon reading the specification. The present application includes such modifications and is limited only by the scope of the claims.

What is claimed is:

1. A spark plug comprising:
   an insulating body defining a longitudinal axis and comprising a base portion and an obstruction portion;
   a first electrode comprising a proximal portion, a distal portion and a sheathed portion between said proximal portion and said distal portion, said sheathed portion of said first electrode extending through said base portion of said insulating body; and
   a second electrode comprising a proximal portion, a distal portion and a sheathed portion between said proximal portion and said distal portion, said sheathed portion of said second electrode extending through said base portion and said obstruction portion of said insulating body, said first electrode and said second electrode being spaced apart to define a gap therebetween,
   wherein said obstruction portion axially extends beyond said distal portion of said first electrode, wherein said obstruction portion is positioned in flow alignment with said gap with respect to a flow path of a rocket propellant to sustain a flame proximate said gap, and wherein said obstruction portion is positioned downstream of said gap with respect to said flow path of said rocket propellant.

2. The spark plug of claim 1 wherein said insulating body is monolithic.

3. The spark plug of claim 1 wherein said insulating body comprises an electrical insulator material.

4. The spark plug of claim 3 wherein said electrical insulator material comprises a ceramic material.

5. The spark plug of claim 1 further comprising a threaded collar connected to said base portion of said insulating body.

6. The spark plug of claim 1 wherein said obstruction portion has a first length along said longitudinal axis, wherein said gap is defined between said distal portion of said first electrode and said distal portion of said second electrode, said gap having a second length along said longitudinal axis, and wherein said second length is greater than said first length.

7. The spark plug of claim 6 wherein said first length is at least 20 percent of said second length.

8. The spark plug of claim 1 wherein said second electrode comprises a bend such that a distal-most tip of said second electrode is substantially axially aligned with a distal-most tip of said first electrode.

9. The spark plug of claim 1 wherein said obstruction portion comprises a circular cross-sectional shape.

10. The spark plug of claim 1 wherein said obstruction portion comprises an obround or elliptical cross-sectional shape.

11. A rocket propellant ignition system comprising:
  a combustion chamber defining a longitudinal axis;
  a rocket propellant flowing through said combustion chamber in a flow path; and
  a spark plug extending into said combustion chamber, said spark plug comprising:
    an insulating body comprising a base portion and an obstruction portion;
    a first electrode extending through said base portion of said insulating body, wherein said first electrode comprises a distal-most tip; and
    a second electrode extending through said base portion and said obstruction portion of said insulating body, said second electrode being spaced apart from said first electrode to define a gap therebetween,
  wherein said obstruction portion axially extends beyond said distal-most tip, wherein said obstruction portion is in flow alignment with said gap with respect to said flow path of said rocket propellant, and wherein said obstruction portion is positioned downstream of said gap with respect to said flow path of said rocket propellant.

12. The rocket propellant ignition system of claim 11 wherein said combustion chamber is cylindrical.

13. The rocket propellant ignition system of claim 11 wherein said rocket propellant comprises a fuel component and an oxidizer component.

14. The rocket propellant ignition system of claim 11 wherein said rocket propellant has a flame speed, and wherein a superficial velocity of said rocket propellant is greater than said flame speed.

15. The rocket propellant ignition system of claim 11 wherein said insulating body is monolithic.

16. The rocket propellant ignition system of claim 11 wherein said obstruction portion comprises a circular cross-sectional shape.

17. A vehicle comprising said rocket propellant ignition system of claim 11.

18. The vehicle of claim 17 being a rocket.

19. A method for igniting a flowing rocket propellant comprising the steps of:
  flowing a rocket propellant in a flow path through a gap formed between a first electrode and a second electrode, wherein said first electrode passes through a base portion of an insulating body, wherein said first electrode comprises a distal-most tip, wherein said second electrode passes through an obstruction portion of said insulating body and said base portion of said insulating body, wherein said obstruction portion axially extends beyond said distal-most tip, wherein said obstruction portion is positioned in flow alignment with said gap with respect to said flow path of said rocket propellant to obstruct said flow path of said rocket propellant;
  applying a voltage across said first electrode and said second electrode to generate a spark in said gap to ignite the flowing propellant; and sustaining a flame in said obstructed flow path after said spark ceases to exist.

20. The method of claim 19 wherein said rocket propellant has a flame speed, and wherein a superficial velocity of said rocket propellant is greater than said flame speed.

* * * * *